United States Patent [19]
Branc et al.

[11] Patent Number: 6,081,356
[45] Date of Patent: Jun. 27, 2000

[54] INTEGRATED OPTICAL PORTS

[75] Inventors: Joseph R. Branc, Grand Rapids; Carl V. Forslund, III, East Grand Rapids; William L. Miller, Ada; Joel D. Stanfield, Grand Rapids, all of Mich.

[73] Assignee: Steelcase Development Inc., Grand Rapids, Mich.

[21] Appl. No.: 08/863,225

[22] Filed: May 27, 1997

[51] Int. Cl.[7] .......................... H04B 10/20; H04B 10/00
[52] U.S. Cl. .................. 359/118; 359/118; 359/159; 359/163; 359/172
[58] Field of Search .................. 359/172, 159, 359/163, 118; 361/683

[56] References Cited

U.S. PATENT DOCUMENTS

| | | | |
|---|---|---|---|
| D. 358,380 | 5/1995 | Sakaguchi | D14/114 |
| 3,330,955 | 7/1967 | Barecki et al. | |
| 3,705,986 | 12/1972 | Sanders et al. | |
| 4,402,090 | 8/1983 | Gfeller et al. | 455/601 |
| 4,408,543 | 10/1983 | Griffin | |
| 4,426,738 | 1/1984 | Sato | |

(List continued on next page.)

FOREIGN PATENT DOCUMENTS

| | | |
|---|---|---|
| 3223-831 | 2/1983 | Germany . |
| 58-114639 | 7/1983 | Japan . |
| 60-7232 | 1/1985 | Japan . |
| 60-180230 | 9/1985 | Japan . |
| 62-14539 | 1/1987 | Japan . |
| 62-14540 | 1/1987 | Japan . |
| 2-87836 | 3/1990 | Japan . |
| 3-274837 | 12/1991 | Japan . |
| 2 079 088 | 1/1982 | United Kingdom . |

OTHER PUBLICATIONS

"Migrations™", Brayton International, 1996, pp. 1–16.
"Group Encoding Method for Infrared Communication" IBM Technical Disclosure Bulletin, vol. 28, No. 10, Mar. 1986, pp. 4440—4441.
"Asynchronous Communication Link for Infrared Transmission" IBM Technical Disclosure Bulletin, vol. 28, No. 9, Feb. 1986, pp. 4083–4085.

(List continued on next page.)

*Primary Examiner*—Jason Chan
*Assistant Examiner*—Mohammad Sedighian
*Attorney, Agent, or Firm*—Foley & Lardner

[57] ABSTRACT

An optical access system is shown for use in an office setting including a workstation providing for communication between a network and a computing device, the workstation having a worksurface and at least one network access point coupled to an optical network port. The computing device has a device access point coupled to an optical device port for direct optical communication with the optical network port. The optical access system includes an access station containing the optical network port so that the optical network port is selectively adjustable in a vertical direction by manually repositioning with respect to the computing device and the worksurface. Direct optical communication between the optical network port and the optical device port can be maintained notwithstanding the presence of objects that may obstruct direct optical communication. The optical access system may include a portable computer having a base and a covering lid to which the optical device port is mounted. A workstation providing for direct optical communication between a network and a computing device having a remote port is also disclosed. The workstation includes an article of furniture and an access station installed within the article of furniture providing at least one network access point and including a plurality of optical network ports. At least one network access point is coupled to the network and to each of the plurality of optical network port. The computing device is selectively adjustable in position relative to the article of furniture to establish a network connection within the workstation between the computing device and the network through the network access point by establishing direct optical communication between the remote port and at least one of the plurality of optical network ports.

40 Claims, 16 Drawing Sheets

U.S. PATENT DOCUMENTS

| | | |
|---|---|---|
| 4,516,221 | 5/1985 | Nakata et al. . |
| 4,628,541 | 12/1986 | Beavers . |
| 4,659,048 | 4/1987 | Fahrion . |
| 4,717,913 | 1/1988 | Elger . |
| 4,727,600 | 2/1988 | Avakian . |
| 4,807,222 | 2/1989 | Amitay ........................................ 370/85 |
| 4,809,257 | 2/1989 | Gantenbein et al. ........................ 370/4 |
| 4,959,874 | 9/1990 | Saruta et al. . |
| 4,975,926 | 12/1990 | Knapp .......................................... 375/1 |
| 4,977,618 | 12/1990 | Allen . |
| 5,068,916 | 11/1991 | Harrison et al. . |
| 5,087,982 | 2/1992 | Smothers .................................. 359/137 |
| 5,099,346 | 3/1992 | Lee et al. . |
| 5,191,461 | 3/1993 | Cranshaw et al. . |
| 5,218,356 | 6/1993 | Knapp ...................................... 342/350 |
| 5,235,258 | 8/1993 | Schuerch . |
| 5,247,380 | 9/1993 | Lee et al. . |
| 5,253,095 | 10/1993 | Menadier et al. ....................... 359/174 |
| 5,276,703 | 1/1994 | Budin et al. . |
| 5,305,132 | 4/1994 | Fasen et al. ............................. 359/113 |
| 5,307,297 | 4/1994 | Iguchi et al. . |
| 5,309,351 | 5/1994 | McCain et al. . |
| 5,321,542 | 6/1994 | Freitas et al. . |
| 5,363,229 | 11/1994 | Sakurai et al. .......................... 359/159 |
| 5,384,652 | 1/1995 | Allen et al. .............................. 359/172 |
| 5,387,994 | 2/1995 | McCormack et al. . |
| 5,416,627 | 5/1995 | Wilmoth . |
| 5,424,859 | 6/1995 | Uehara et al. . |
| 5,438,937 | 8/1995 | Ball et al. ................................. 108/64 |
| 5,508,836 | 4/1996 | DeCaro et al. . |
| 5,530,435 | 6/1996 | Toms et al. ......................... 340/825.07 |
| 5,564,070 | 10/1996 | Want et al. . |
| 5,566,022 | 10/1996 | Segev . |
| 5,596,648 | 1/1997 | Fast ........................................... 381/77 |
| 5,600,471 | 2/1997 | Hirohashi et al. ....................... 359/152 |
| 5,606,444 | 2/1997 | Johnson et al. ......................... 359/152 |
| 5,617,236 | 4/1997 | Wang et al. .............................. 359/172 |
| 5,627,524 | 5/1997 | Fredrickson et al. ............. 340/825.07 |
| 5,646,761 | 7/1997 | Medved et al. ......................... 359/172 |
| 5,681,008 | 10/1997 | Kinstler .................................. 244/3.11 |
| 5,697,193 | 12/1997 | Forslund et al. ....................... 52/220.5 |
| 5,781,407 | 7/1998 | Brauel ..................................... 361/683 |

OTHER PUBLICATIONS

"Infrared Communication for In–House Applications", F.R. Gfeller, H.R. Muller and P. Vettiger, IEEE, 1978, pp. 132–138.

"Wireless In–House Data Communication via Diffuse Infrared Radiation" Fritz R. Gfeller and URS Bapst, IEEE, vol. 67, No. 11, Nov. 1979, pp. 1474–1486.

"Touchpad Cable Function" IBM Technical Disclosure Bulletin, vol. 28 No. 9, Feb. 1986, pp. 4089–4090.

"Infranet: Infrared Microbroadcasting Network for In–House Data Communication", Fritz Gfeller, pp. P27–1–P27–4.

"Product Solutions Guide" Extended Systems®, Mar. 1997, pp. 1–16.

"Minicomputer System Components Interconnected Via a Serial Infrared Link", F. Gfeller and E. Mumprecht, IBM Technical Disclosure Bulletin, vol. 25 No. 8, Jan. 1983, pp. 4135–4137.

"Teamwork™ There are Forces at Work", Metropolitan Furniture Corporation.

"Wireless Infrared Connections for Portable Computer Users" Extended Systems® (printed from the Internet).

"New Data/Telecom Connector Housings" Steelcase, 1988.

"Cable Facts" Steelcase, 1993, pp. 2–13.

"ACTiSYS" (printed from Internet on May 9, 1997).

"Making Network Access Easy for Portable PC Users" Hewlett Packard (printed from Internet on May 9, 1997).

"HP Netbeamir Infrared Access Point—Product Specifications" Hewlett Packard (printed from Internet on May 9, 1997).

"HP Creates a Simple, Reliable Way to Connect Portable PC's to a LAN" Hewlett Packard (printed from Internet on May 9, 1997).

"Desk Top Computing" Hewlett Packard (printed from Internet on May 9, 1997).

"Wireless File Transfer Between Notebook and Desktop PCs" TekrAm (printed from Internet on May 9, 1997).

"Products Overview" Parallax Research (printed from Internet on May 9, 1997).

"VIPER IRDA Infrared Adapter for PC Motherboard" Parallax Research (printed from Internet on May 9, 1997).

"PLX 1000" Parallax Research (printed from Internet on May 9, 1997).

"Infrared Data Association Serial Infrared Link Access Protocol (IrLAP) Version 1.0" Infrared Data Association, Jun. 23, 1994, pp. 2–113 and Version 1.1, Oct. 17, 1995, pp. ii–33.

"HP To Support New 4MBPS Infrared Networking Product" Hewlett Packard (printed from Internet on May 9, 1997).

"Company Background" VideoLabs, dated Dec. 9, 1996 (3 pages).

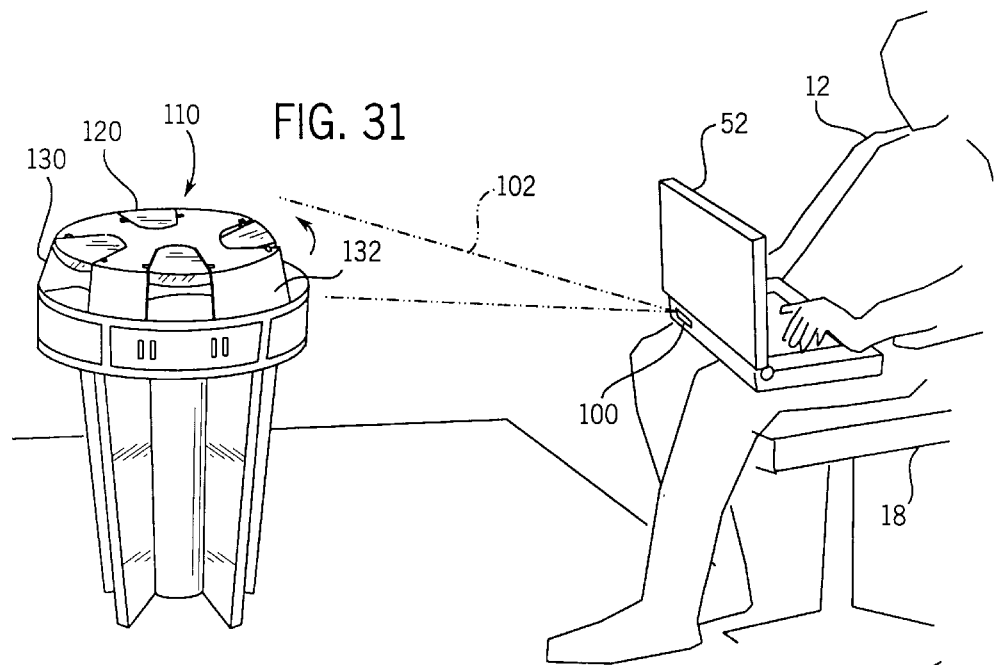
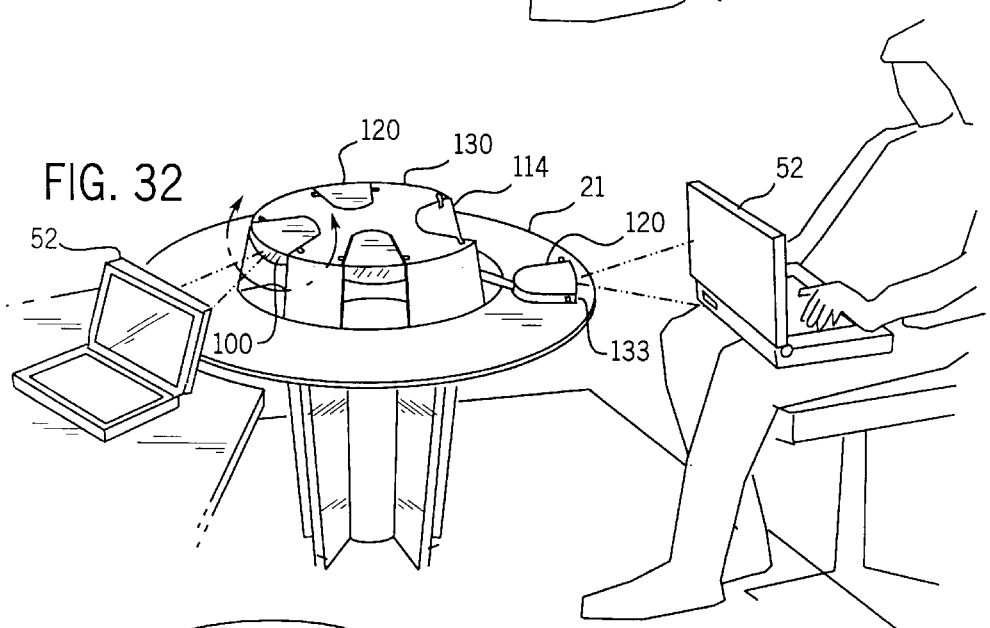
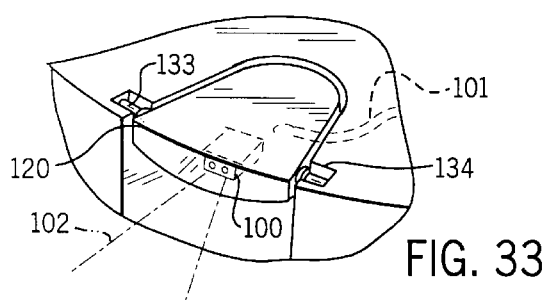

INTEGRATED OPTICAL PORTS

FIELD OF THE INVENTION

The present invention relates to a workstation having an integrated optical interface port. In particular, the present invention relates to a workstation providing optical ports so that electronic devices also provided with optical ports used at the workstation can be placed in data communication with a computer network or other electronic devices.

BACKGROUND OF THE INVENTION

A variety of systems providing for wireless communications in an office or work environment are known. Such known systems include directed infrared systems, diffuse or reflected infrared systems, and radio frequency wireless systems, each of which may provide for high-speed data communications between electronic devices. For example, the system disclosed in U.S. Pat. No. 4,975,926 employs diffuse or reflected infrared signals to transmit data between electronic devices. The system disclosed in U.S. Pat. No. 4,727,600 shows the use of directed infrared signals to establish communications between electronic devices and intermediate transceivers (for example, ceiling- or wall-mounted repeaters).

Data communications in a system employing directed infrared signals is made over a direct (line-of-sight) optical interface link through free space between an optical port (infrared transceiver, e.g. an infrared transmitter and receiver) associated with one electronic device and an optical port (infrared transceiver) associated with another electronic device. Directed infrared systems, which transmit an optical signal directly between points, provide security and performance advantages over diffuse or reflected infrared systems or radio frequency systems, which essentially "broadcast" a signal that may be received at one or more other points (whether or not reception is intended). Directed infrared signals also are typically free from noise or electromagnetic interference concerns, which tend to arise in certain wireless communications systems. Moreover, as of the present, while industry standards have been promulgated for directed infrared systems, no industry standards exist for diffuse infrared or radio frequency systems.

The Infrared Data Association (IrDA) has promulgated industry standards for directed infrared data communications between electronic devices, including the Infrared Data Association Serial Infrared Physical Layer Link Specification (version 1.1) and the Infrared Data Association Serial Infrared Link Access Protocol (version 1.0). These IrDA standards, which are incorporated by reference herein, provide not only a protocol for data communications between electronic devices, but also physical parameters, such as optical interface specifications and optical link parameters. IrDA compliance is therefore essentially independent of the particular implementation of infrared technology and the particular manufacturer of the electronic device. According to these standards, electronic devices incorporating IrDA-compliant infrared technology (e.g. optical interface ports with associated transceivers, encoder/decoders, drivers, etc.), compatible for data communications with other IrDA-compliant electronic devices, are now commercially available.

Manufacturers have incorporated IrDA-compliant infrared technology into a wide variety of electronic devices, for example, mobile computing devices and portable computers (such as laptop or notebook computers), personal digital assistants (PDAs) or other data devices (such as organizers), network adapters, printers or other peripherals, cellular telephones, pagers and the like. For example, commonly available portable computers (such as the Hewlett-Packard OmniBook 5500CT) and PDAs (such as the Apple Newton Message Pad 2000) may provide optical interface ports according to IrDA standards. Data communications between such electronic devices can readily be established when the corresponding optical ports are positioned and aligned within specified physical parameters (i.e. angle and distance). Communication software, such as Microsoft Infrared Communication Software for Windows® 95, is commercially available for IrDA-compliant computing devices that include an optical port. According to the IrDA standards, communications between IrDA-compliant electronic devices can be established at substantial data rates (e.g. 4 M bytes/second).

Computer networks, such as a local area network (LAN), are now common to the office environment, allowing office workers to access or share network resources from electronic or computing devices with other persons within the network or beyond. Such networks typically include one or more network servers, computers which provide for access to network resources, such as databases or shared files, application programs, electronic mail, network printers and other shared peripherals, or other networks (such as intranets or the Internet). Typically, an electronic device makes a physical connection at a network access point, the physical connection being made with a wire or cable. (Networking of electronic devices in this manner is well-known in the office or work environment.)

However, IrDA standards have fostered the development of directed infrared systems by which electronic or computing devices may be networked (i.e. connected to the LAN or the like) in an office or work environment. Known systems, such as those commercially available from the Hewlett-Packard Company under the name "NetBeamIR", provide for an IrDA-compliant network access point in the form of an optical port (contained in a movable housing with an associated infrared transceiver) that is also physically connected to the network. The optical port may be aligned with an optical port of an IrDA-compliant computing device to allow infrared data communications between the computing device and the network according to IrDA standards. Similarly, the "JETEYE" product offered by Extended Systems, Inc. includes a movable optical port in a device (a housing resembling a computer mouse) that can be aligned with a corresponding optical port on the computing device to establish an optical link according to the IrDA standards. (Other companies, such as ACTiSYS, Tekram and Parallax Research, also provide IrDA-compliant network connectivity products.)

According to these arrangements, the optical link is made along the top of a worksurface and therefore is susceptible to interruption by obstructions that may be present between the corresponding optical ports on the worksurface. This is in part due to present configurations of the worksurface and the design of the workstations and associated articles of furniture (e.g. desks or tables) at which the electronic devices are used. For example, the optical link is quite easily broken (and optical data communications interrupted) when obstructions such as books, papers, pens, cans or other objects, are inadvertently placed on the worksurface between the corresponding optical ports. This susceptibility of the optical link to interruption by such objects (which are common to the workstation) has to some extent limited the usefulness and widespread acceptance of directed infrared data communications in an office environment.

Accordingly, it would be advantageous to have a workstation that is adapted to facilitate optical data communications through a direct optical link between electronic devices in an office or work environment. It would also be advantageous to provide for the physical integration into the workstation of an access station providing one or more optical ports so that data communication between a computer network and an electronic device having an optical port can be established using directed optical signals. It would further be advantageous to have a workstation including one or more article of furniture (such as a desk, table, panel, wall, bin, utility post, chair, accessory or the like) that contains an optical port selectively adjustable in position to form a relatively stable and secure optical link with an optical port associated with an electronic device. It would further be advantageous to provide a network connection in such a workstation both for a single user or a plurality of users (each having a computing device of some type) through directed infrared signals.

SUMMARY OF THE INVENTION

The present invention relates to an optical access system for use in an office setting including a workstation adapted to provide for communication between a network and a computing device, the workstation having a worksurface and also having at least one network access point coupled to an optical network port, the computing device having a device access point coupled to an optical device port adapted for direct optical communication with the optical network port. The optical access system includes an access station containing the optical network port so that the optical network port is selectively adjustable in a vertical direction by manually repositioning the port device with respect to the computing device and the worksurface. Direct optical communication between the optical network port and the optical device port can be maintained in avoidance of one or more objects that may obstruct direct optical communication.

The present invention also relates to an optical access system for use in an office setting including a workstation adapted to provide for communication between a network and a computing device, and also having at least one network access point coupled to an optical network port, the computing device having a device access point coupled to an optical device port adapted for direct optical communication with the optical network port. The optical access system includes an access station installed within the workstation. The access station contains at least one optical network port.

The present invention further relates to an optical access system for use in an office setting including a workstation adapted to provide for communication between a network and a computing device, the workstation having a worksurface and also having at least one network access point coupled to an optical network port, the computing device having a device access point coupled to an optical device port adapted for direct optical communication with the optical network port. The computing device is a portable computer having a base and a covering lid and the optical device port is mounted to the lid of the portable computer so that direct optical communication between the optical network port and the optical device port can be maintained notwithstanding the presence of one or more objects on the worksurface that may obstruct direct optical communication.

The present invention further relates to a workstation adapted to provide for direct optical communication between a network and a computing device having a remote port. The workstation includes an article of furniture and an access station installed within the article of furniture providing at least one network access point and including a plurality of optical network ports. At least one network access point is coupled to the network and to each of the plurality of optical network ports. The computing device is selectively adjustable in position relative to the article of furniture to establish a network connection within the workstation between the computing device and the network through the network access point by establishing direct optical communication between the remote port and at least one of the plurality of optical network ports.

BRIEF DESCRIPTION OF THE DRAWINGS

FIG. 31 is a perspective view of a workstation (also showing a computing device and user) according to an exemplary embodiment of the present invention.

FIG. 32 is a perspective view of a workstation (also showing computing devices and a user) according to an exemplary embodiment of the present invention.

FIG. 33 is a fragmentary perspective view of an access device according to FIGS. 31 and 32.

DETAILED DESCRIPTION OF THE PREFERRED EMBODIMENTS

Figure 1:
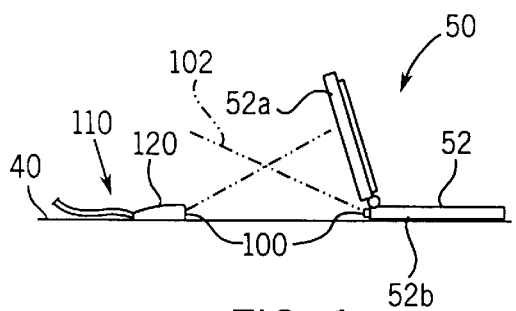
FIGS. 1 through 7 are schematic diagrams of the line-of-sight optical link between a computing device having an optical device port and an access station having an optical port (associated with a computer network or the like).

According to a conventional arrangement for establishing optical data communications between electronic devices, a direct (i.e. line-of-sight) optical link is established between an optical port associated with a so-called primary device (such as a portable computer having a device access point) and an optical port associated with a so-called secondary device (such as a computer network connection providing a service or network access point). (The optical port associated with an electronic device may be referred to as an "optical device port"; the optical port associated with the computer network may be referred to as an "optical network port.") The optical link is established according to certain physical parameters (typically defined by the specifications or standards for the optical interface). For example, according to the present IrDA standards, which are incorporated by reference herein, the optical link can be established within a half-angle of approximately 15 degrees (defining a conical space about the optical axis normal to each optical port) and a link length of approximately one meter.

Referring to FIGS. 1 through 7, shown are schematic diagrams of the line-of-sight connection between a computing device 50 (shown as a portable computer 52) having a first optical port 100 and a second optical port 100 contained within an access station or device and associated with a computer network (not shown). As shown, computing device 50 rests on a worksurface 40 provided within a workstation. Computing device 50 and the computer network are in optical communication through their respective optical ports 100 (which are conventional infrared elements, having associated transceivers each with an infrared transmitter and an infrared receiver and data communications circuitry). Optical communication as shown in FIGS. 1 through 7 can be provided according to the present IrDA standards. Each of optical ports 100 provides an essentially conical space 102 within which infrared communications can be established; connection is therefore established by locating optical ports 100 so that their respective conical spaces overlap within a suitable link length.

Figure 2:
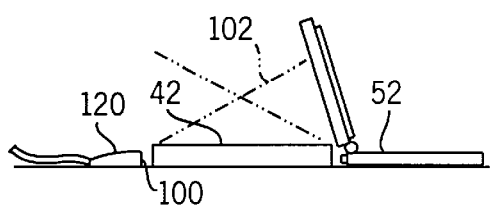

It is conventional to provide an IrDA-compliant portable computer 52 with an optical port, typically installed at or along the bottom surface of its base 52b (as shown in FIGS. 1 and 2) to allow an optical communications with another IrDA-compliant electronic device. As is evident, the electronic device can be equipped with a network connection with a corresponding optical port installed in an access station 110 shown as including an access device 120 (resembling a computer mouse-like "puck") positionally adjustable essentially along worksurface 40. As shown in FIG. 2, however, when an obstruction 42 (e.g. a book, a stack of papers, a cup or can, a device, or any other matter such as may appear on a worksurface) is placed in the line of sight between optical ports 100, conical spaces 102 are occluded and the network connection is interrupted.

Figure 3:
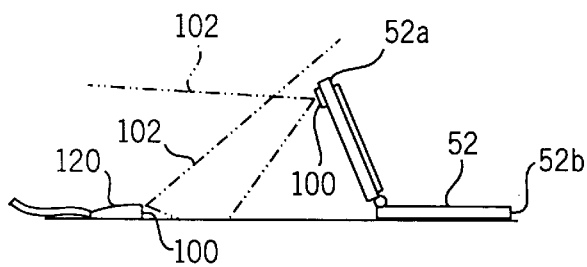
Figure 4:
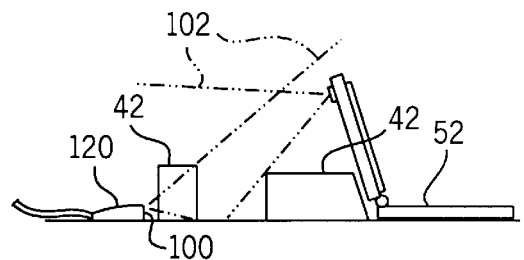

One solution to this problem is shown in FIG. 3, where portable computer 52 is provided with an optical port 100 on its lid 52a (i.e. the back of the display), which removes the conical space 102 to a position that is above many common worksurface obstructions. However, as shown in FIG. 4, if the corresponding optical port 100 of the access device 120 is maintained at the worksurface level, then the susceptibility to obstructions 42 on worksurface 40 remains.

Figure 5:
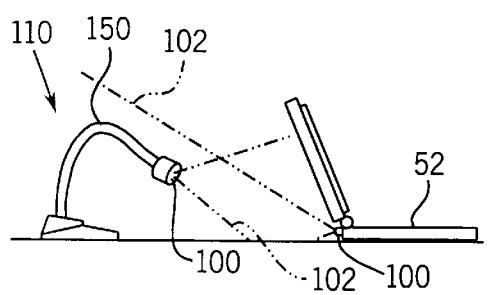
Figure 6:
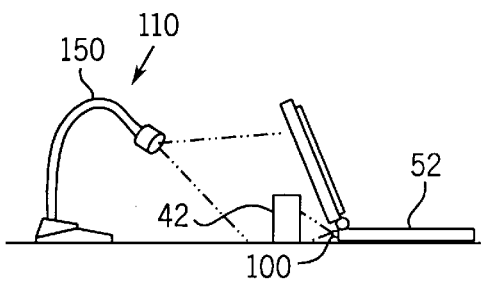
Figure 7:
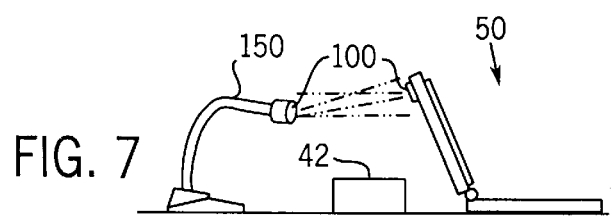

Another solution to the problem is thus shown in FIGS. 5 through 7, where optical port 100 is installed within an access station 110 including an articulable stalk 150 (e.g. a conventional "gooseneck" structure positionally adjustable at and above the worksurface) so that the line-of-sight coupling with optical port 100 of portable computer 52 can be adjusted within a wide range of flexibility. As shown in FIGS. 5 through 7, the effectiveness of this solution in preventing interruption of the network connection by worksurface obstructions is enhanced when portable computer 52 is also provided with an optical port 100 on its lid 52a. It is with these features in mind that other aspects of the various embodiments of the present invention can be more fully explained and understood.

Figure 8:
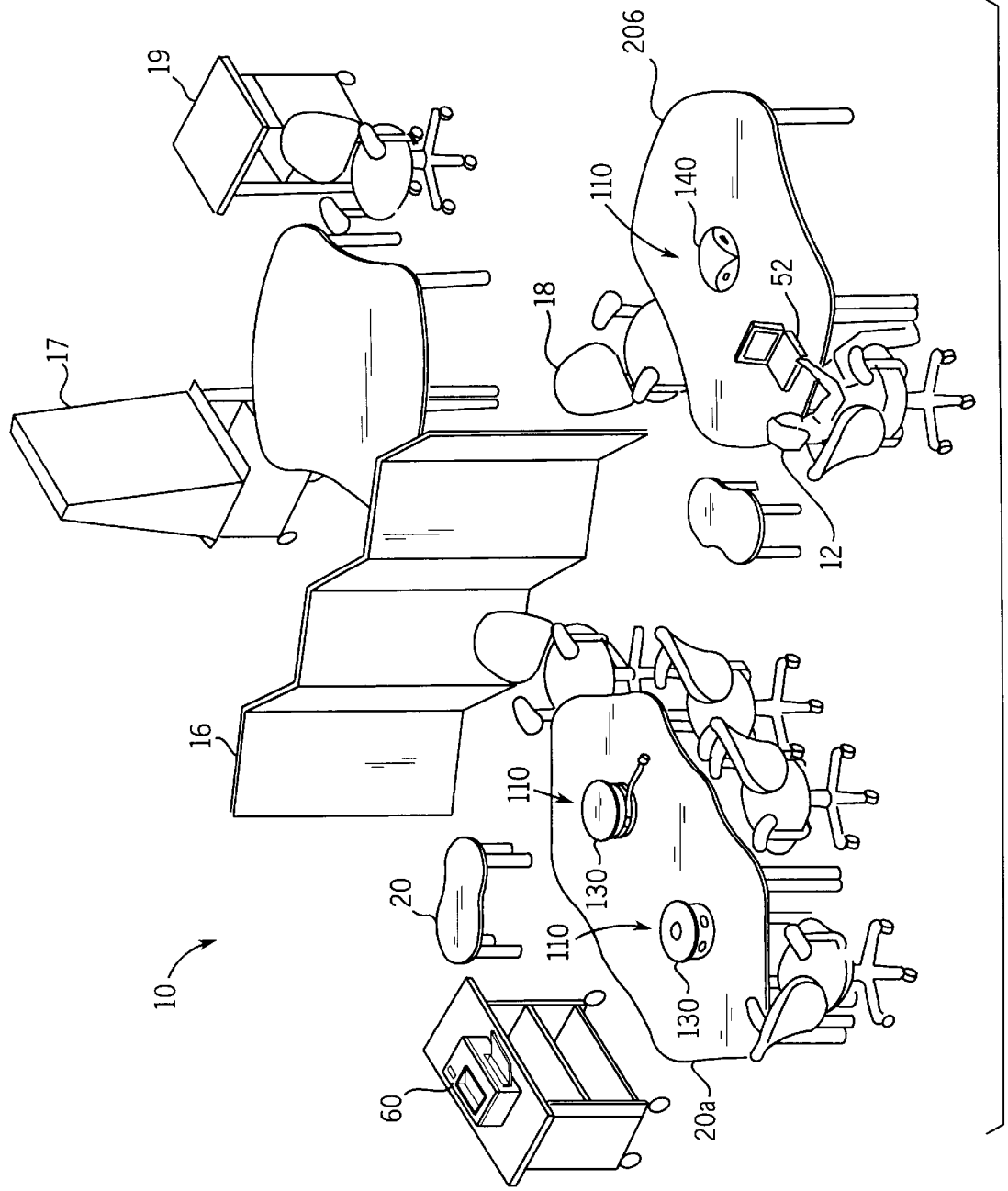
FIG. 8 is a perspective view of an office environment (also showing furniture articles and computing devices) according to an exemplary embodiment of the present invention.

The present invention is particularly well-suited for use with office furniture, meaning any furniture, furniture accessories, and work tools designed for use in working or learning environments, including offices, hotels, schools and homes. FIG. 8 is intended to show an exemplary office environment 10. Within office environment 10 are various representative articles of furniture, such as tables 20, chairs 18, carts 19, space dividers (panels 16) and easel 17. According to any preferred embodiment of the present invention, the articles of furniture may include workstations, desks, chairs, tables, panels or walls, shelves, drawers, bins, utility posts (which may incorporate various other utilities and equipment) and other accessories, any of which may be found in an office environment. Also shown in FIG. 8 is a computing device and a peripheral (printer 60). According to any preferred embodiment of the present invention, the computing devices may include personal computers (PCs) of any configuration, portable computers, notebook computers, personal digital assistants (PDAs) or personal organizers, other mobile computing devices, printers and other computer peripherals, data devices or other instruments, telephones and telephony equipment, any of which may be found in an office environment.

Figure 9:
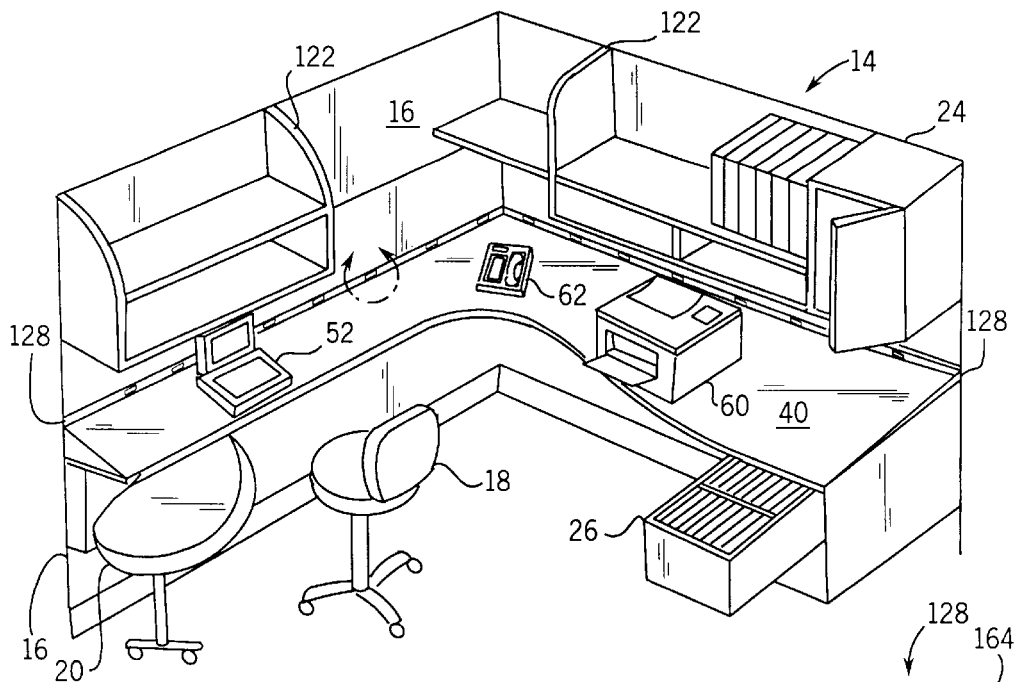
FIGS. 9 and 11 are perspective views of a workstation (also showing computing devices and peripherals) according to exemplary embodiments of the present invention.
Figure 11:
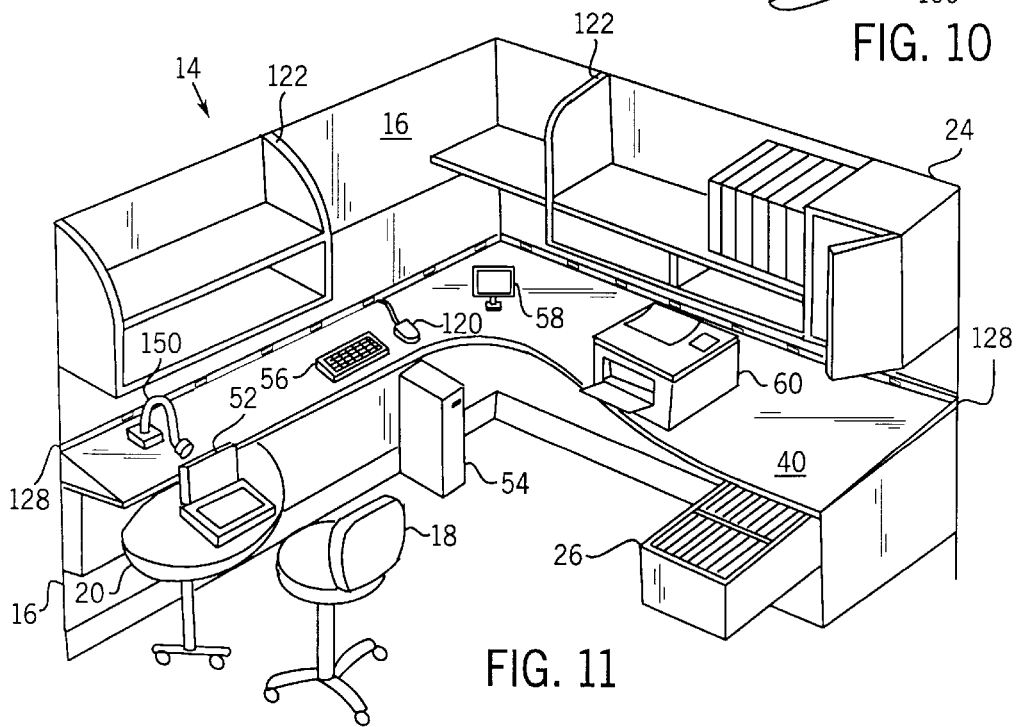

A workstation 14 is shown in FIGS. 9 and 11, where various computing devices have been arranged as may be the case in an office environment. For example, in workstation 14 of FIG. 9, a portable computer 52, telephone 62, and printer 60 are included; workstation 14 also includes a worksurface 40, panels 16, a chair 18, a table 20, shelves 122, a binder bin 24, and a drawer 26. In the workstation of FIG. 11, also shown is a personal computer 54 (with keyboard 56, display 58 and base unit). It should also be noted that the terms "office environment" and "workstation" are intended to be given broad scope, to a wide variety of other environments, for example, laboratories and factories, where electronic devices are used. As is evident, in any preferred embodiment, the workstation provides an infrastructure for optical data communications.

Figure 10:
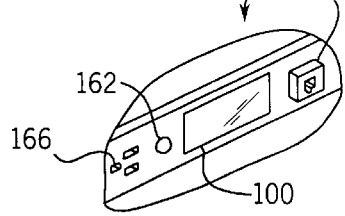
FIG. 10 is a fragmentary perspective view of a detail of an optical port contained in the workstation of FIG. 9.

FIGS. 8 through 11 also include integrated access stations 110 providing optical ports 100 that allow the connection of computing devices to a computer network. (The access stations provide what may be designated service access points by the network and associated with a secondary device such as a network connection or outlet which are in communication with device access points associated with a primary device such as a portable computer.) In FIG. 8, table 20a includes two access stations 110, shown as (hub-like) utility posts 130, and table 20b includes one access station 110, shown as fixed hub 140. Each access station includes optical ports 100, utility post 130 at table 20a providing for optical ports on a positionally adjustable stalk 150. An office worker 12 is shown at table 20b using portable computer 52 (in optical communication with the network through hub 140). In FIG. 9, workstation 14 includes an access station 110 for the computing devices that provides a series of optical ports 100 (mounted in a strip 128 along panel just above worksurface 40). FIG. 10 shows a detail of one of the ports, which also has associated with it an electrical outlet 166, an optical connection indicator (light) 162, and a telephony/network outlet 164. In FIG. 11, workstation 14 includes access stations in the form of strip 128 and also other positionally adjustable devices, stalk 150 and puck 120. Note that according to alternative embodiments, the strip can be mounted at other horizontal levels (for example, at levels above common worksurface obstructions) or in a vertical orientation within the workstation.

Figure 12:
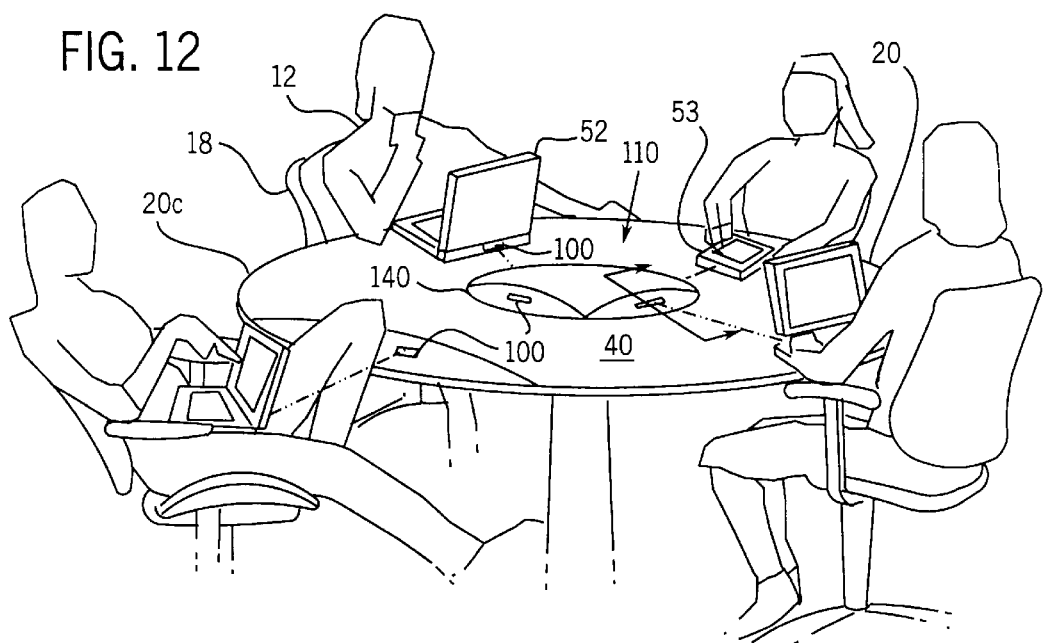
FIG. 12 is a perspective view of a workstation (also showing computing devices and users) according to an exemplary embodiment of the present invention.
Figure 13:
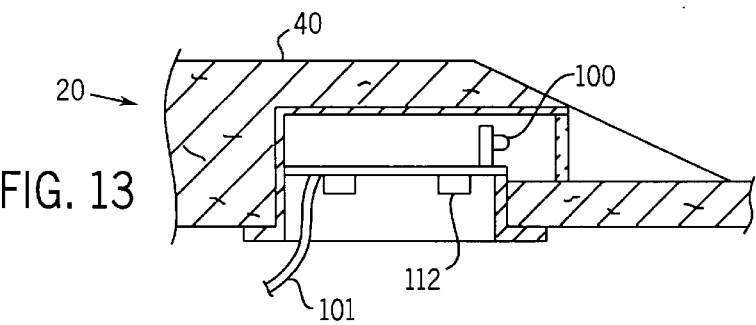
FIG. 13 is a fragmentary sectional elevation view of a detail of the workstation of FIG. 12.
Figure 14:
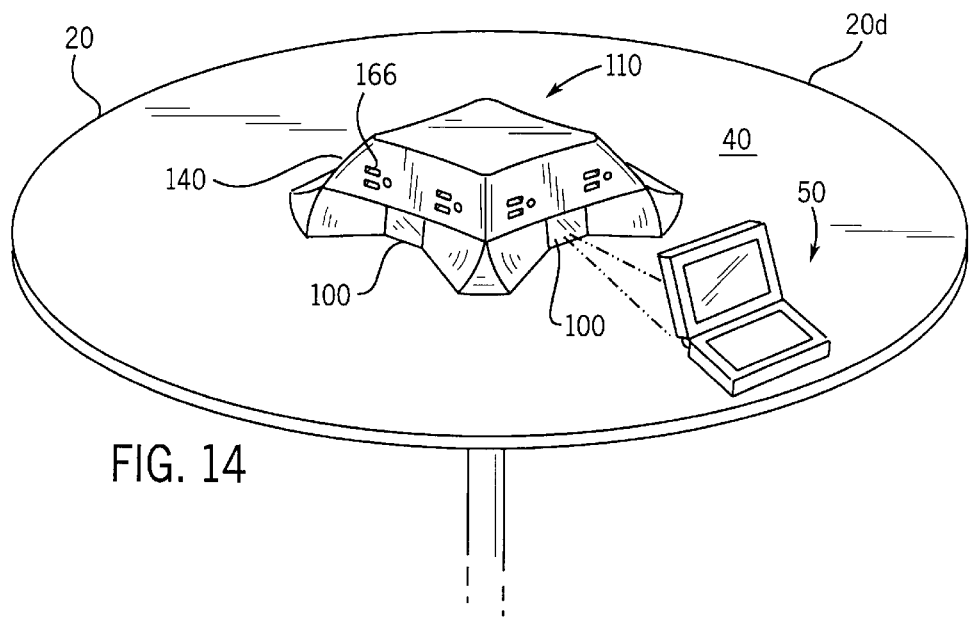
FIG. 14 is a perspective view of a workstation (also showing a computing device) according to an exemplary embodiment of the present invention.

FIGS. 12 and 14 show workstations including tables 20c and 20d each providing an access station in the form of a hub 140 having optical ports 100 installed within to allow network connection by computing devices (shown as portable computers 52 and a PDA 53). Hubs 140 are centrally located within their respective tables 20c and 20d but do provide for any positional adjustability for the optical ports installed therein, thus the computing devices (which may include optical ports that are or are not adjustable) must be positioned appropriately on the worksurface 40 to establish and maintain network connections. Table 20c also includes an optical port 100 installed at its edge so that a user can establish a network connection with a computing device that is removed from the table (e.g. positioned on the user's lap, as shown in FIG. 12). Hub 140 in table 20d also integrates electrical outlets 166. FIG. 13 shows a detail of the integrated optical port installation (including optical port 100 and associated data communications circuitry 112) within table 20c.

Figure 15:
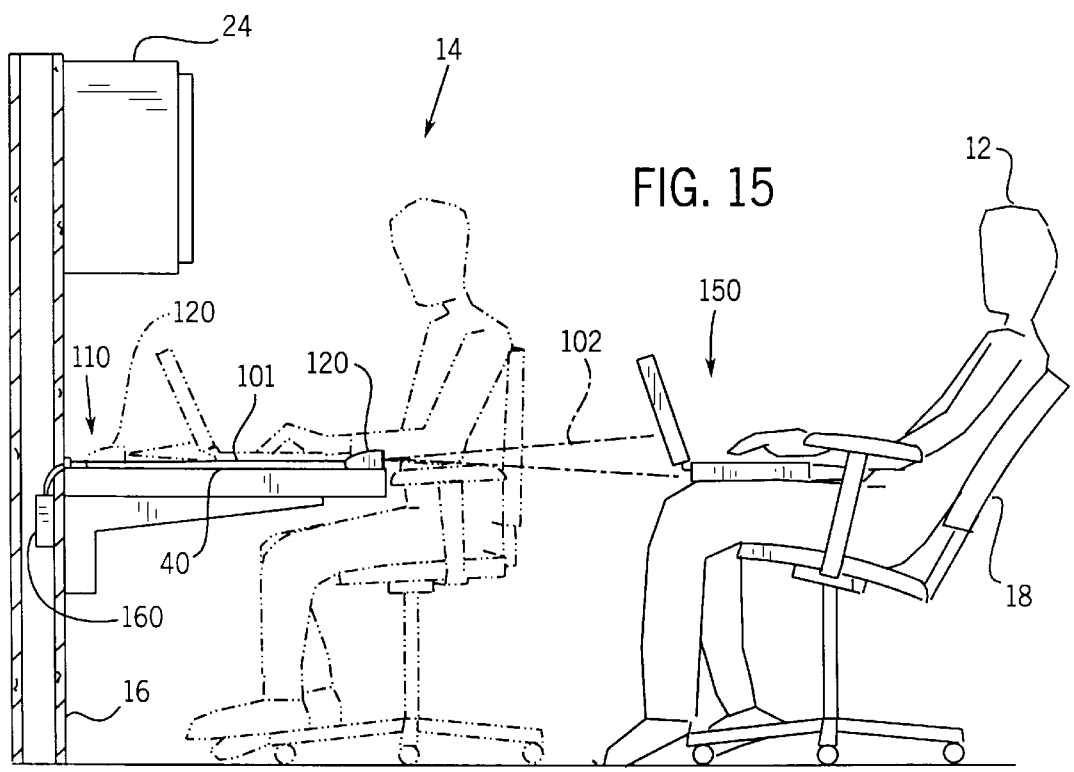
FIGS. 15 and 16 are elevation views of workstations (also showing a computing device and a user) according to exemplary embodiments of the present invention.
Figure 16:
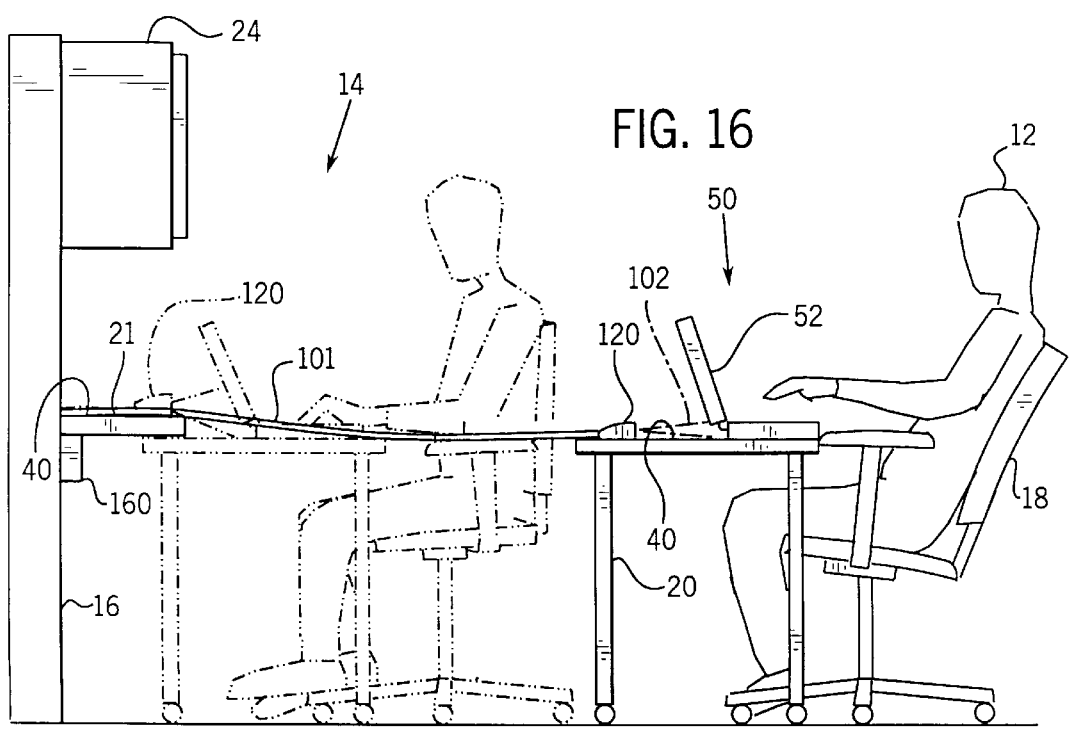

FIGS. 15 and 16 show a workstation 14 where the network access is provided through an optical port installed within an access device shown as puck 120 (within access station 110). Puck 120 is physically and electrically connected to workstation 14 (i.e. on a cable 101), but is positionally adjustable along one or more of the worksurfaces 40 provided within the workstation. As shown in FIG. 15, user 12 of portable computer 52 (seated at chair 18) can establish a network connection while working at or off the worksurface by moving puck 120 to a suitable position. In FIG. 16, the worksurface 40 for user 12 (seated on chair 18) associated portable computer 52 is provided by a movable table 20; network connection is established and maintained by positioning puck 120 either on a ledge 21 or on table 20.

Figure 25:
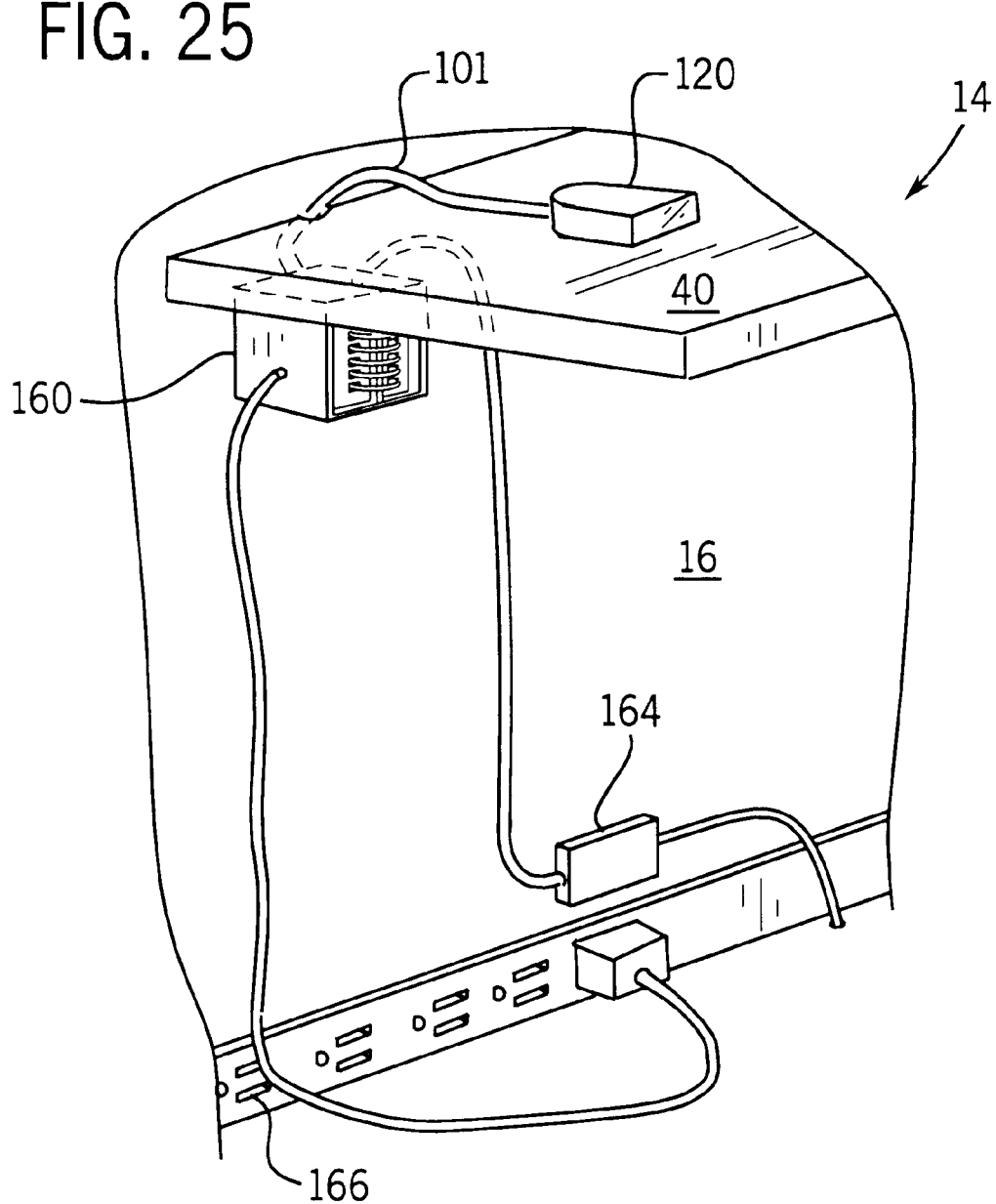
FIG. 25 is a fragmentary sectional perspective view of a workstation (showing an access device and a network outlet).
Figure 26:
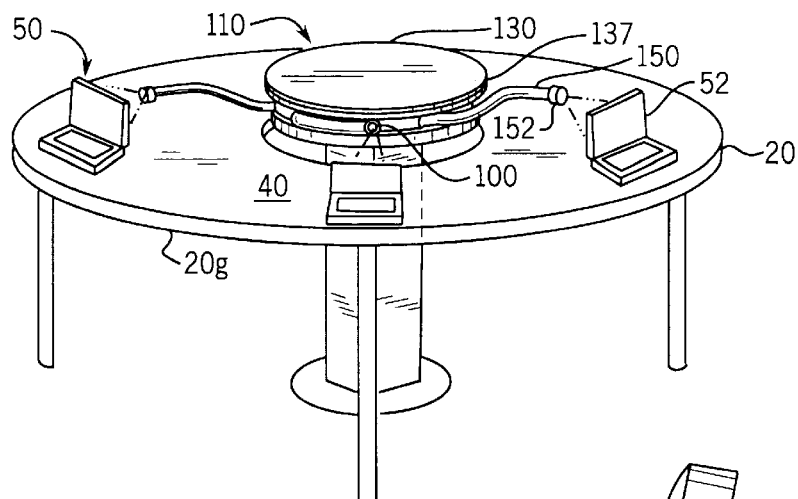
FIG. 26 is a perspective view of a workstation (also showing computing devices) according to an exemplary embodiment of the present invention.
Figure 27:
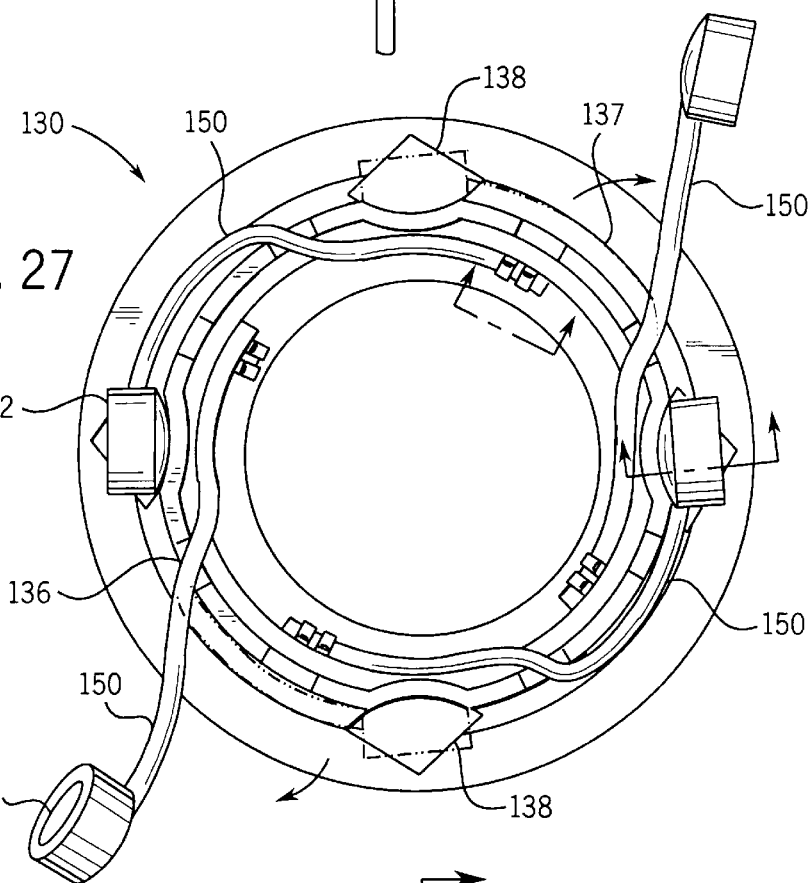
FIG. 27 is a fragmentary sectional view of the workstation (showing detail of the access devices) of FIG. 27.
Figures 28, 29, 30:
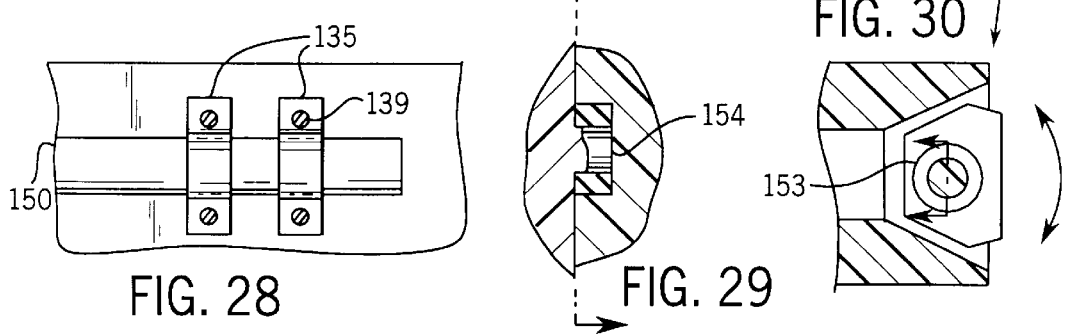
FIGS. 28 through 30 are fragmentary sectional side views of the workstation (showing additional detail of the access devices) of FIGS. 27 and 28.

As shown in FIGS. 15 and 16, puck 120 is connected to a network outlet 160 mounted within the workstation 14. Network outlet 160 (mounted to panel 16) and associated wiring, which is conventional according to an exemplary embodiment, is shown in FIG. 25. As is evident, according to any preferred embodiment, a workstation may be configured to provide one or several network access points (i.e. distinct connections or ports to the computer network) so that one or several users can connect their respective computing devices, which have device access points (i.e. distinct connections or ports to the computing device) to the network from an access station (i.e. a place where the optical ports are installed or positioned on or within an article of furniture). Interconnection between the device access points of the computing devices and the network access point integrated in the workstation is established by direct optical link.

Figure 17:
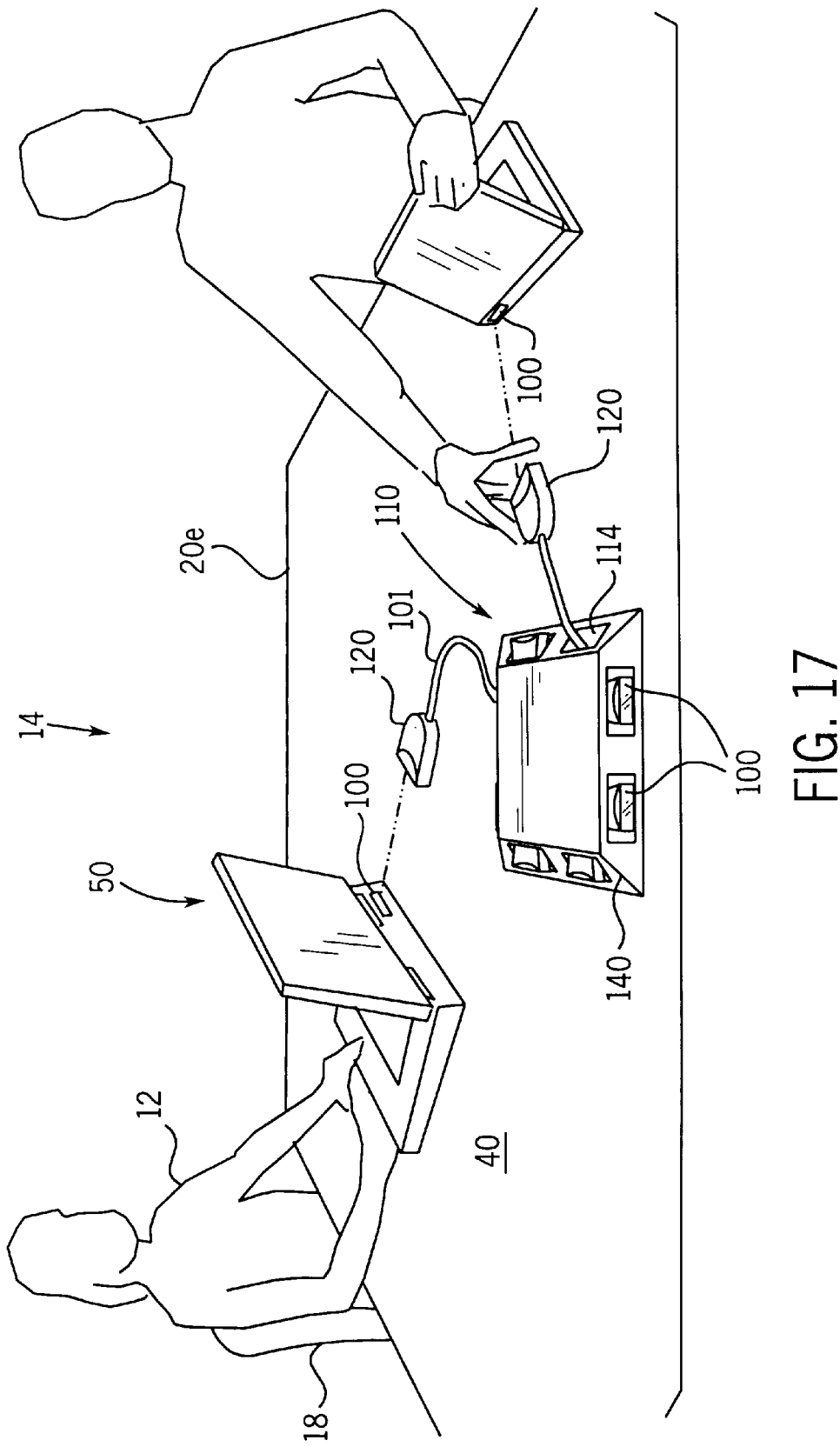
FIG. 17 is a perspective view of a workstation (also showing computing devices and users) according to an exemplary embodiment of the present invention.

FIG. 17 shows a workstation 14 including a table 20e and a hub 140 (i.e. access stations) providing for a series of pucks 120, each capable of establishing a network connection for a computing device 50. Hub 140 provides receptacles 114 for pucks 120. While hub 140 is installed within table 20e, pucks 120 (connected to hub 140 by cables 101) are positionally adjustable along the worksurface 40 of table 20e. When not in use, pucks 120 can be replaced within receptacles 114. As is apparent, pucks 120 need not be removed from receptacle 114 of hub 140 to establish a network connection with a computing device. Accordingly, users of computing devices 50, themselves repositionable along or near the worksurface 40, are provided with enhanced flexibility for making a network connection.

Figure 18:
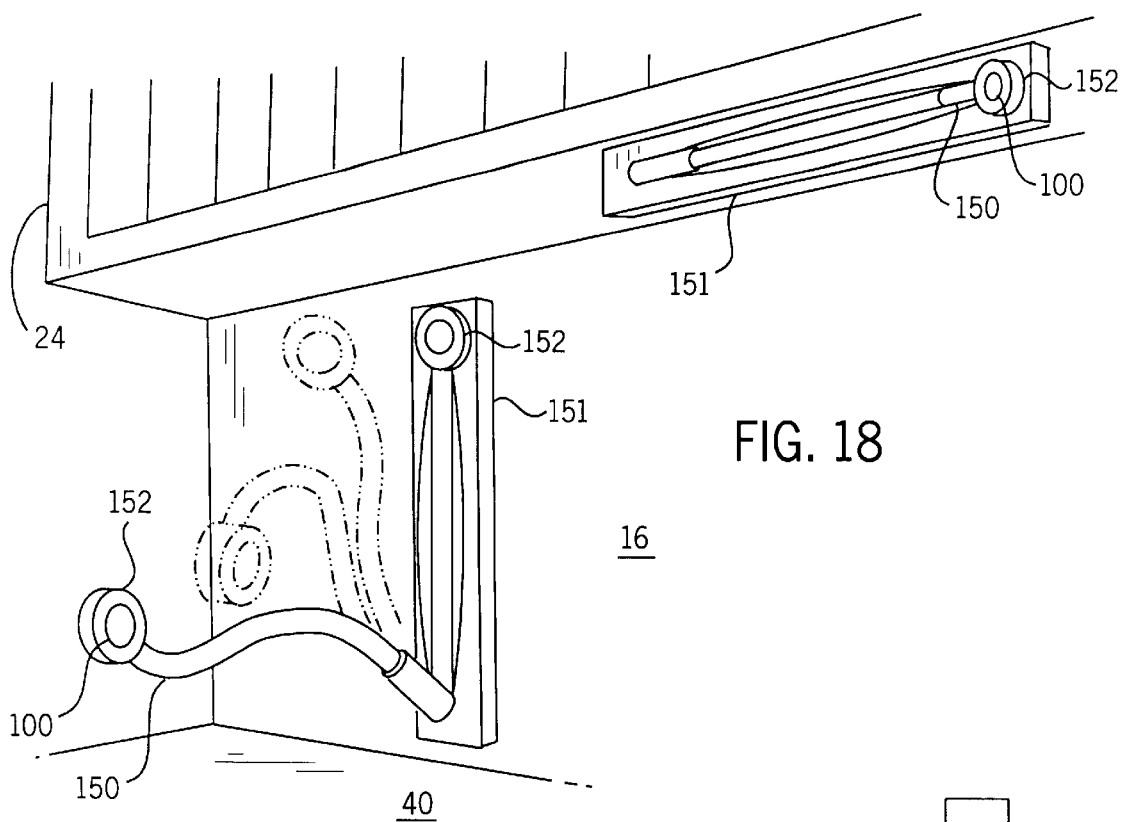
FIG. 18 is a fragmentary perspective view of a workstation according to an exemplary embodiment of the present invention).
Figure 19:
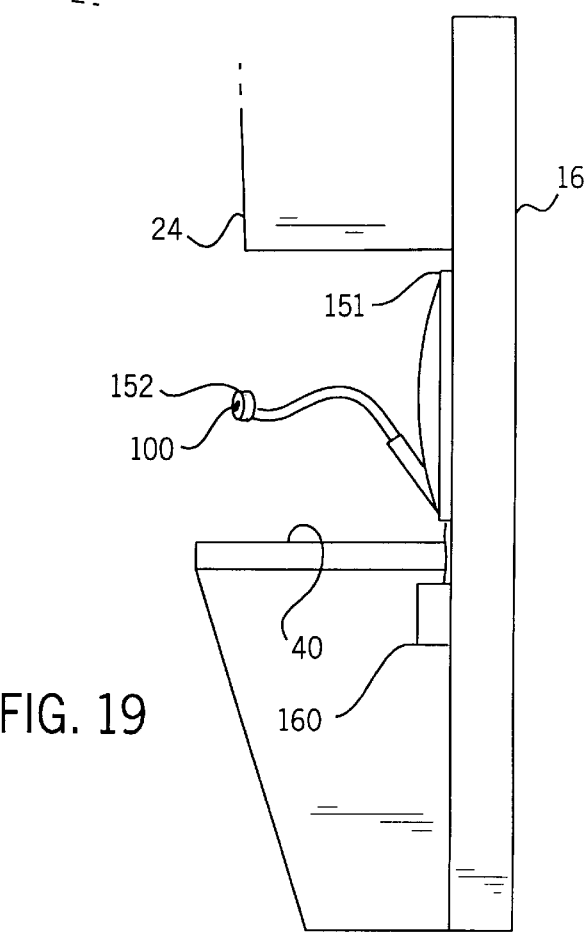
FIG. 19 is an elevation view of a workstation according to an exemplary embodiment of the present invention.
Figure 36:
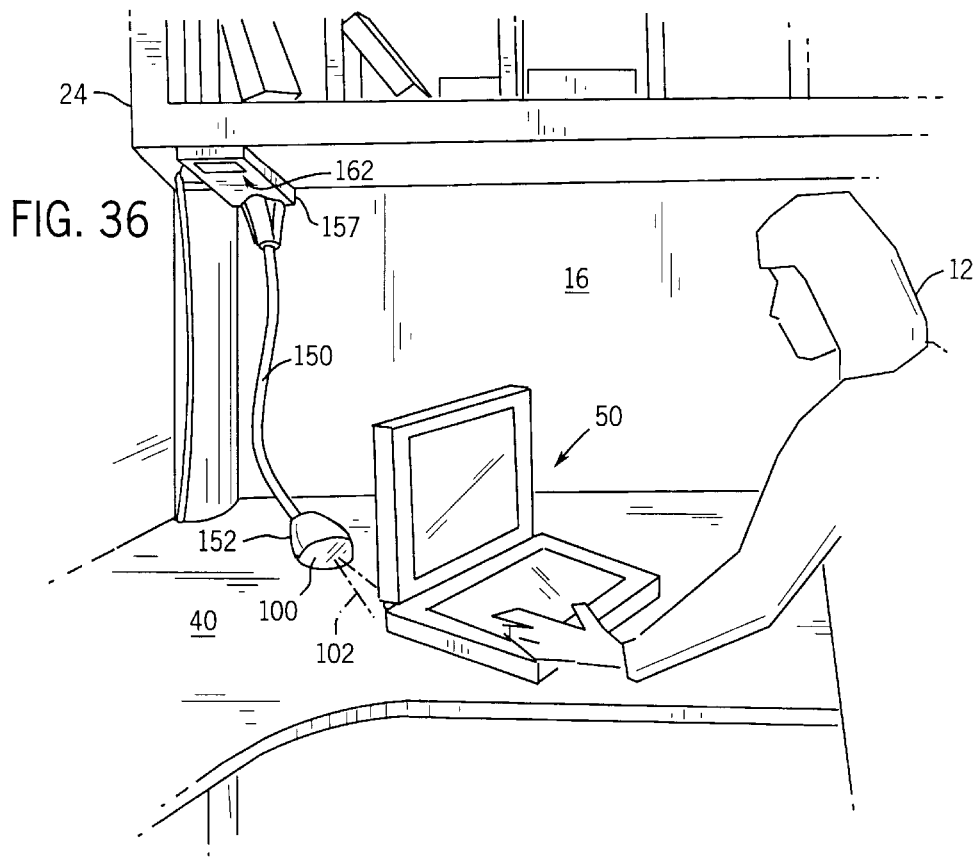
FIG. 36 is a perspective view of a workstation (also showing computing devices and a user) according to an exemplary embodiment of the present invention.
Figure 37:
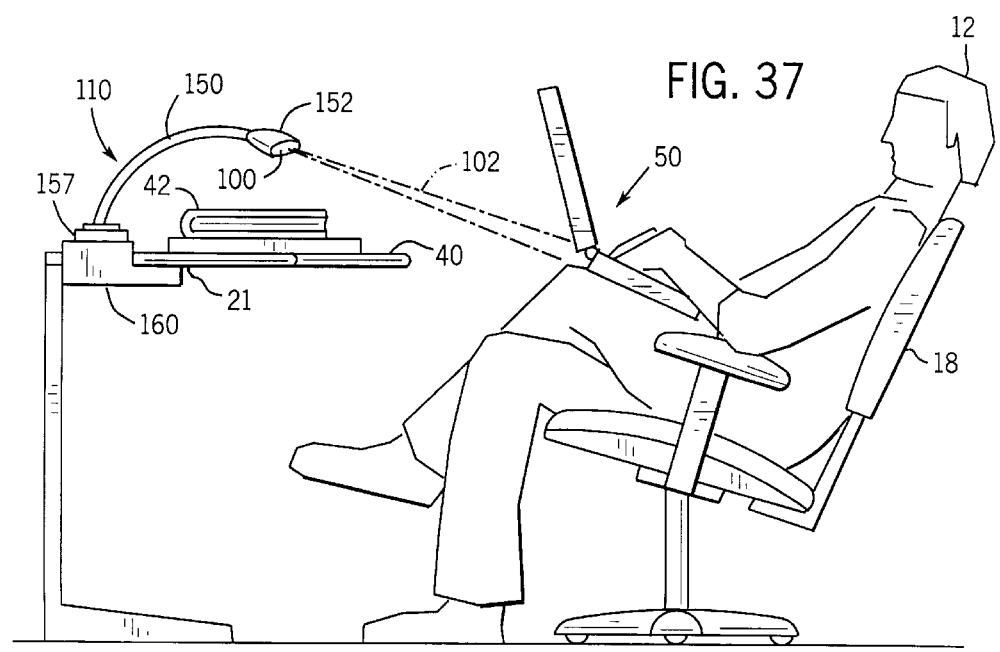
FIG. 37 is an elevation view of a workstation according to an exemplary embodiment of the present invention.

As shown in FIGS. 18 and 19, a workstation can be provided with network access provided by flexible stalks 150 (i.e. articulable "gooseneck" structures associated with access stations) containing optical ports 100 (contained in head 152) in connection with the network (i.e. at network outlet 160). Stalks 150 can be adjusted in position to establish a connection with a computing device (not shown) on the worksurface 40 of the workstation. When not in use, stalks 150 can be stowed (i.e. in a conventional snap-fit arrangement) in a base or housing 151 mounted within the workstation, out of the way of the user. Housing 151 can be mounted in a vertical or horizontal orientation, for example on a panel 16 or a binder bin 24 within the workstation. FIGS. 36 and 37 also show alternative embodiments of a workstation integrating an access station having an optical port 100 provided at head 152 of an articulable stalk 150. As shown in FIG. 36, the base 157 associated with articulable stalk 150 is mounted to binder bin 24; base 157 also includes an optical connection indication (light) 162a (and may also provide other utilities or connections). Computer device 50 is located on worksurface 40 and head 152 of articulable stalk 150 has been adjusted so that the optical ports (one is visible) of the access station 110 and of the computing device 50 are in communication, and user 12 is "connected" to the network. FIG. 37 shows an access station 110 where the base 157 is installed within a ledge 21 (or table) and articulable stalk 150 with head 152 extends vertically above worksurface 40 so that optical port 100 of access station 110 can be placed in communication with optical port 100 of computing device 50. As a result, user 12 seated in chair 18 is able to communicate over the network through an optical link notwithstanding the presence of obstructions 42 (books).

Figure 20:
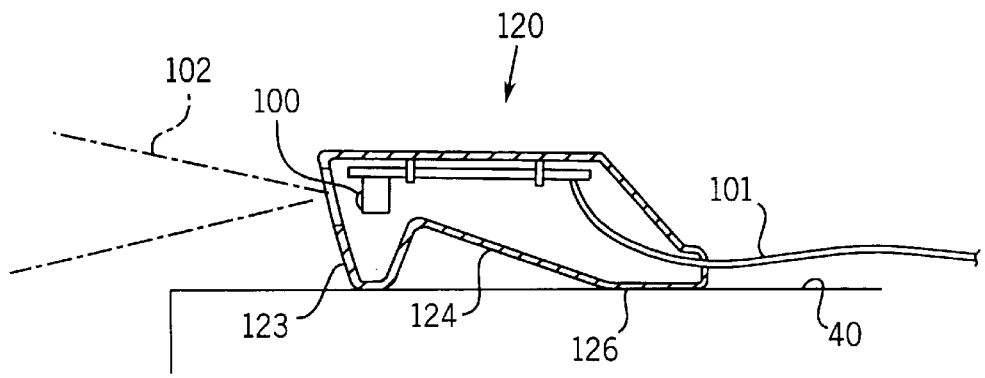
FIGS. 20 and 21 are fragmentary sectional elevation views of a workstation (showing an access device) according to an exemplary embodiment of the present invention.
Figure 21:
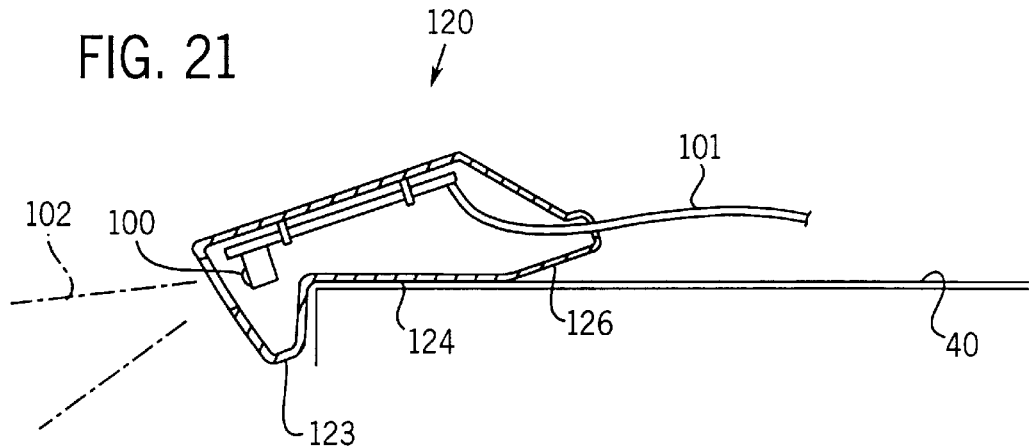

As shown in FIGS. 20 and 21, puck 120 can be configured to align the conical space 102 of its optical port 100 (within conical space 102 optical communication may be established) in two orientations with respect to the worksurface 40. Puck 120 has a leg 123 and a base providing front and rear surfaces 124 and 126. In FIG. 20, puck 120 stands on leg 123 and the rear surface 126 of its base, and optical port 100 is oriented along the worksurface 40 (as when the computing device is on or near the worksurface). In FIG. 21, puck 120 is in an edge-supported position resting on the front surface 124 of its base and optical port 100 is oriented below the worksurface (as when the computing device has been moved from the worksurface). As is apparent, in alternative embodiments, the puck can be configured to provide for a wide variety of optical port orientations (or an optical port that is itself adjustable within the puck).

Figure 22:
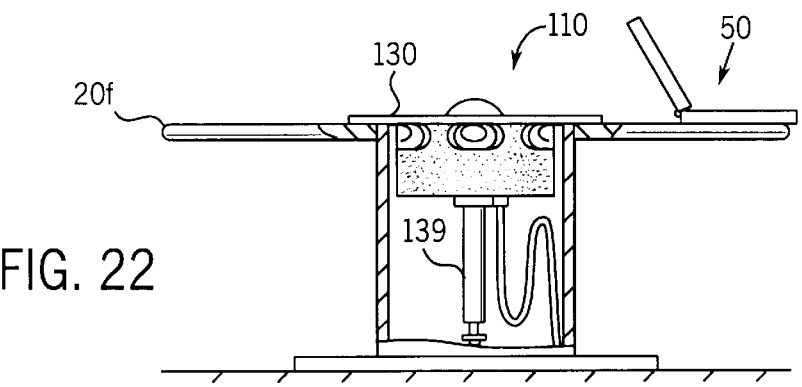
FIGS. 22 through 24 are sectional elevation views of a workstation (also showing a computing device) according to an exemplary embodiment of the present invention.
Figure 23:
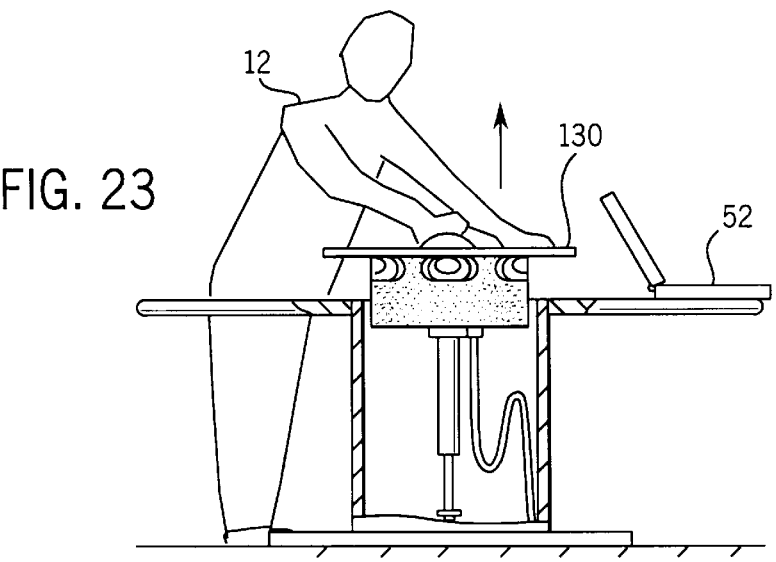
Figure 24:
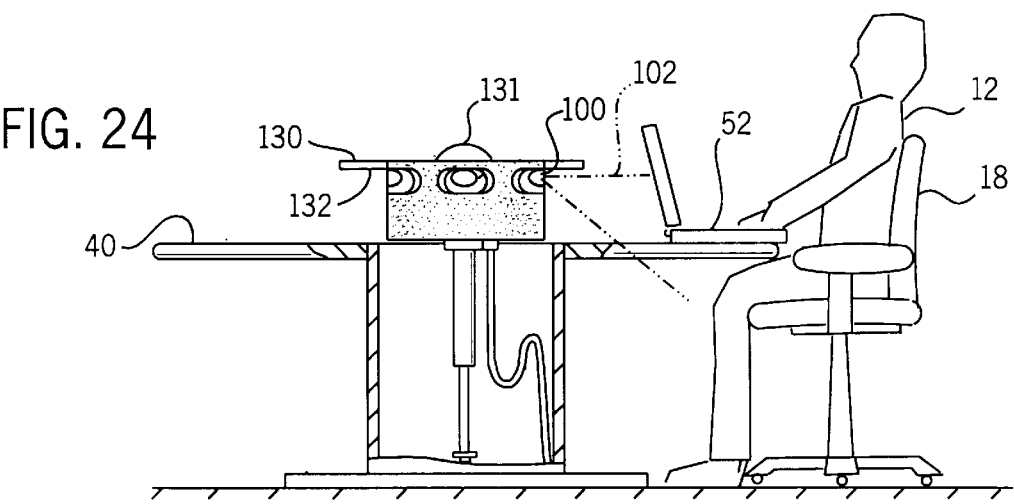

FIGS. 22 through 24 show a workstation 14 including a table 20f with an access station in the form of an integrated vertically adjustable utility post 130 providing optical ports 100 to allow network access for computing devices. When not in use, as when a computing device is not in connection with the computer network, utility post 130 is stowed so that all but upper portion 132 is located below worksurface 40 of table 20f. To prepare for use, as when a user 12 intends to establish a connection between a computing device 50 and the computer network, utility post 130 is pneumatically actuated through actuator 139 at a switch 131 (contained within upper portion 132) and raised to a suitable level so that optical ports 100 are exposed and at an appropriate height (e.g. for a user seated at a chair 18 to connect to the network using a portable computer 52 on worksurface 40). According to a preferred embodiment, the pneumatic system (e.g. actuator 139) and mechanism for the adjustable utility post can be of the type disclosed in product literature and used in the TeamWork product line by Metro Furniture and the Migrations™ product line by Brayton International and in pending U.S. patent application Ser. No. 08/749,146, filed Nov. 14, 1996, commonly assigned, which are incorporated by reference herein. According to any preferred embodiment, the adjustable utility post can be positioned at a variety of heights.

FIGS. 26 through 30 show a particularly preferred embodiment of a workstation 14 in the form of a table 20g including an integrated central utility post 130 with optical ports 100 installed in articulable stalks 150 to provide for network connection to computing devices 50. As shown, articulable stalks 150 provide for a large degree of both vertical and horizontal positional adjustability. In addition, devices (in which optical ports are installed) attached at the heads 152 of articulable stalks 150 are rotatable on a pivot pin 153 coupled (in frictional engagement) in a bearing 154 to provide for additional adjustability (see FIGS. 29 and 30). Four adjustable stalks 150 are installed within utility post 130, mounted (in brackets 135 secured by fasteners shown as screws 139 in FIG. 28) in a compact circular arrangement best shown in FIG. 27. (Associated cabling for completing the network connection from the optical ports is conventional and not shown in FIGS. 27 to 30.) Adjustable stalks 150 extend through apertures 136 in a retaining ring 137 and are readily stowed with their heads 152 in a receptacle 138. Whether stowed or not, the optical ports within the heads 152 of adjustable stalks 150 may be oriented for optical communication with a computing device 50. According to alternative embodiments, a utility post 130 can be provided as a separate structure from the table, for example, as shown in FIG. 31, or as shown in U.S. Pat. No. 5,438,937, which is incorporated by reference herein.

Figure 34:
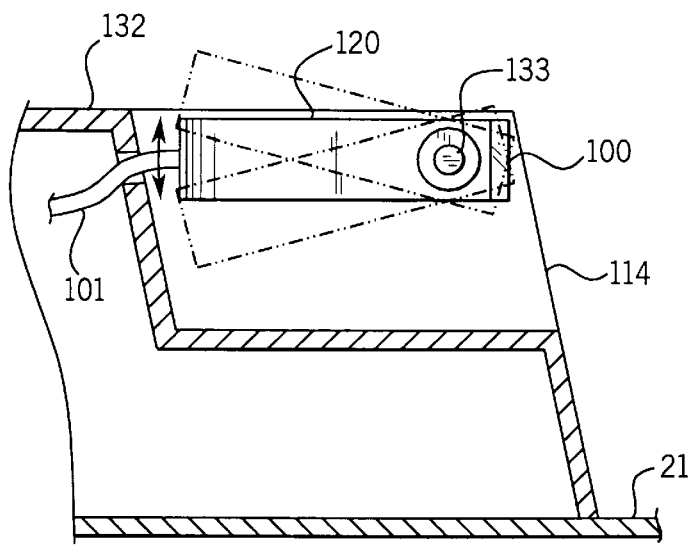
FIG. 34 is a fragmentary sectional side view of the access device of FIG. 33.
Figure 35:
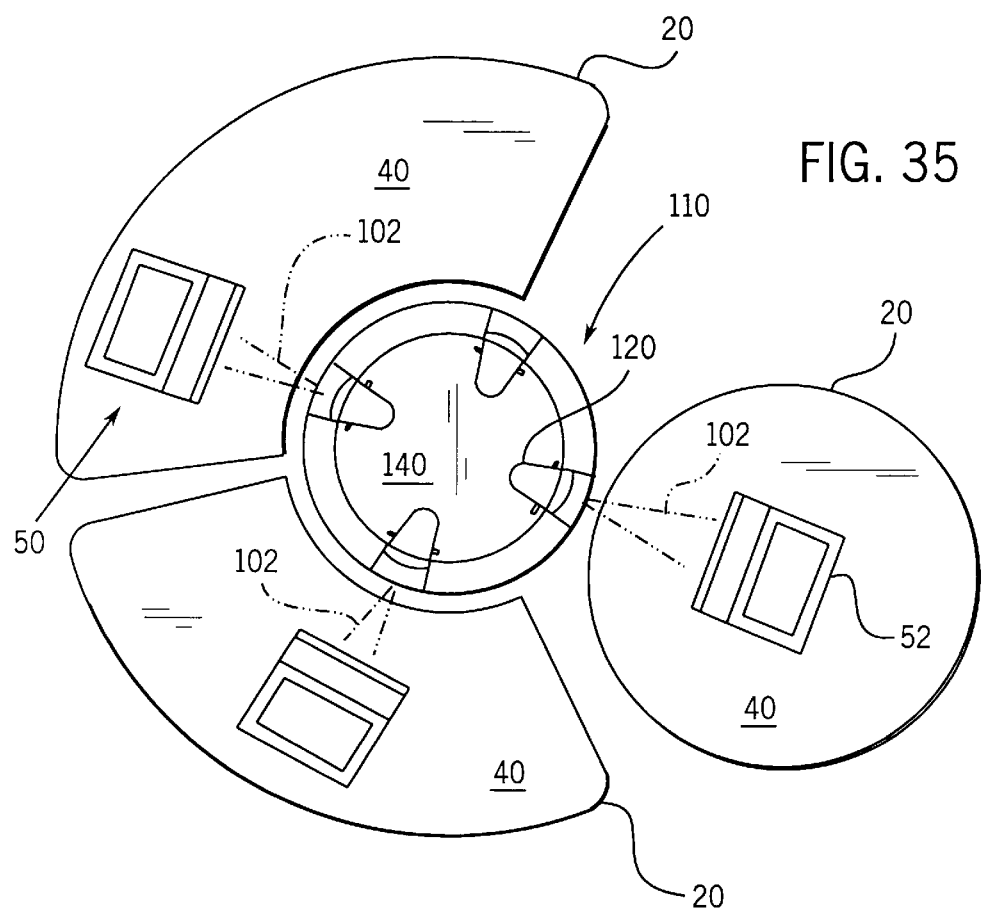
FIG. 35 is a plain view of a workstation (also showing computing devices) according to an exemplary embodiment of the present invention.

FIGS. 31 through 35 relate to a workstation 14 with a utility post 130 having in its upper portion 132 an access station 110 for pivotally adjustable and removable pucks 120 with optical ports 100 to provide for network connection to portable computer 52. As shown, pucks 120 are stowed in receptacles 114 in utility post 130. Pucks 120 include pivot pins 133 that are adjustably maintained in bearings 134 at corresponding receptacles 114 so that the angular orientation of optical ports 100 can be adjusted (as is shown in FIG. 34). Pucks 120 also can be removed from receptacle 114 and repositioned along a worksurface 40. Cables 101 maintained within a central space of access station 110 couple pucks 120 to utility post 130, the length of cables providing a limitation on the extent of positional adjustability (i.e. range) for the pucks. As shown in FIG. 32, utility post 130 can be provided with an integrated ledge 21 beneath access station 110; ledge 21 functions as a worksurface 40. FIG. 35 shows that other worksurfaces (shown as tables 20) can be positioned in proximity to utility post 130 so that multiple users (not shown) with multiple computing devices 50 can establish network connections through the ports contained in utility post 130.

Figure 38:
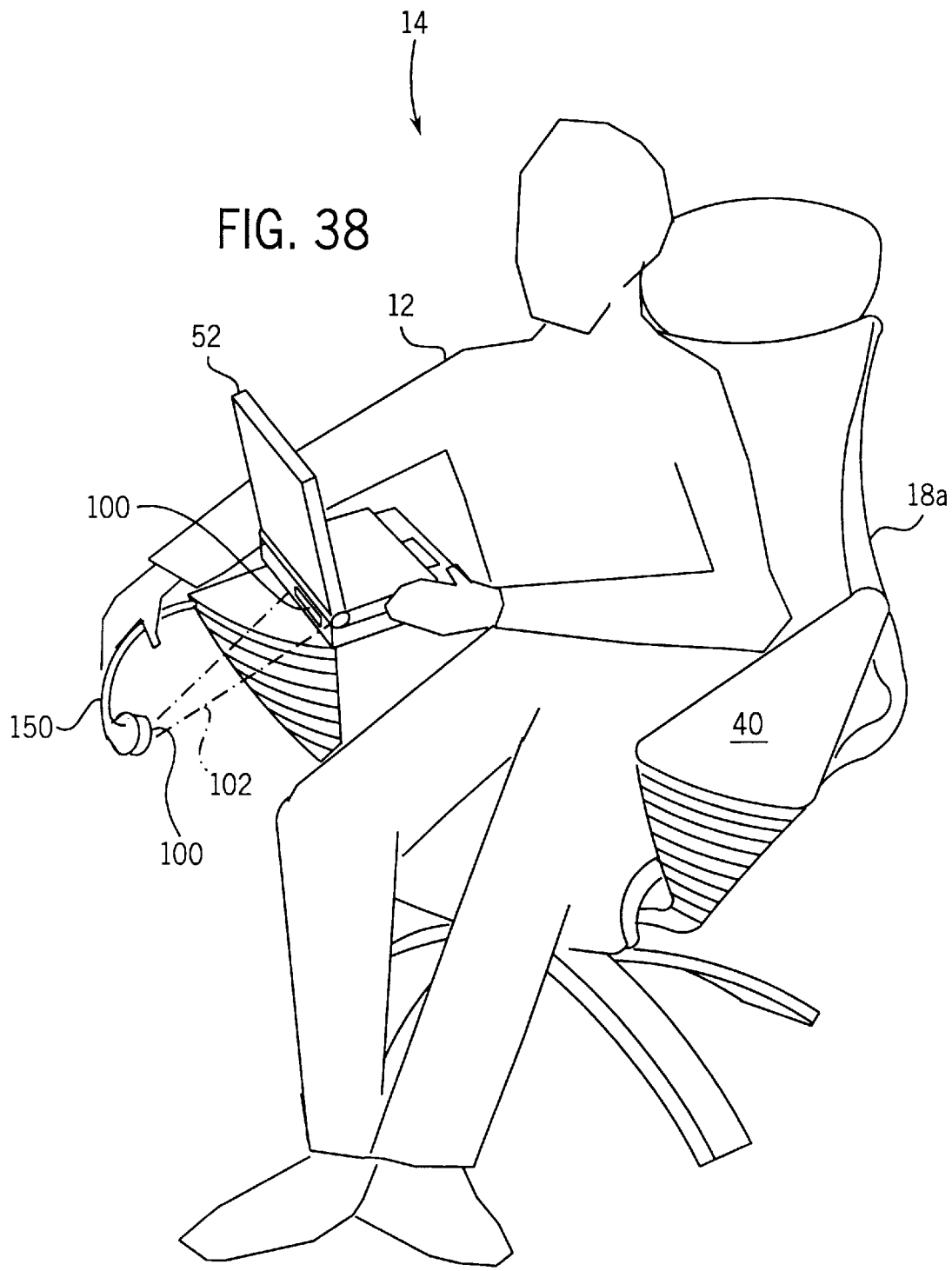
FIG. 38 is a perspective view of a workstation (also showing a computing device and user) according to an exemplary embodiment of the present invention.

As is evident, the concept of providing an optical access system by installing or integrating access stations containing optical ports in articles of furniture is broad in scope and includes a wide variety of alternative embodiments within the scope of the present invention. By example, but not by way of limitation, an alternative embodiment of a workstation is shown in FIG. 38. Workstation 14 includes a chair 18a with an access station with an articulable stalk 150 on which a port 100 is mounted to allow for a network connection to be established with a portable computer 52 (shown resting on one chair arm). User 12 is shown in the process of repositioning stalk 150 to establish the network connection with portable computer 52.

Figure 39:
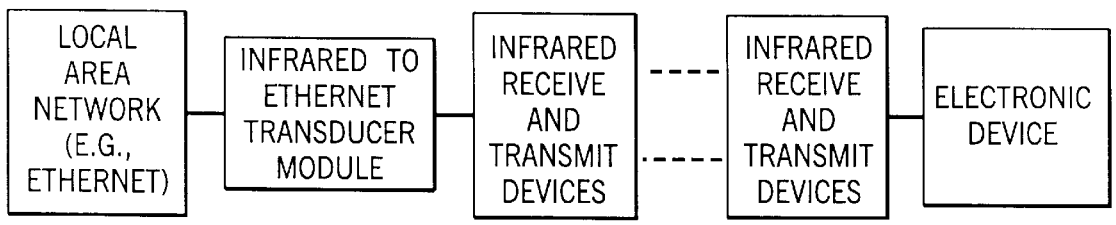
FIG. 39 is a block diagram of an infrared data communication system.

According to a preferred embodiment, shown in FIG. 39, one of the electronic devices is a network server (or like computer) configured to facilitate data communications with and between other electronic devices (such as computers, computing devices, peripherals or the like) in a network (e.g. a local area network or the like). (The network can be of a conventional arrangement, such as commercially available under the name Ethernet.) Each electronic device associated with the network is provided with an access point or node through which a connection can be established with other electronic devices; the network also provides access points or nodes through which a connection can be established with other electronic devices. A data communications link is established between the electronic devices and the network at these nodes. According to any preferred embodiment of the present invention, each node incorporates an optical interface port, which can be an optical network port associated with a network or a device port associated with another electronic device, by which an optical link for data communications can be established between electrical devices associated with each node. Any particularly preferred embodiment will be configured to provide for infrared data communications between the nodes according to the IrDA standards (whether connecting an electronic device to a network or to another electronic device). Alternative embodiments may provide for other types of data communications, independent of the technology.

According to a particularly preferred embodiment, data communications are provided through a conventional arrangement of opti-electronic technology (and associated systems), such as discussed in the IrDA standards. Each optical port includes an infrared transducer module, which provides both an active output interface (e.g. an output driver and light-emitting diode) and an active input interface (e.g. a detector and receiver). Optical signals that are transmitted across free space along the optical link are converted from or into electrical signals within the infrared transducer module. (The infrared transducer module may also be referred to functionally as a transceiver, insofar as it is capable of transmitting and receiving data for optical communications.) Electrical signals are transmitted to or from the infrared transducer module by an encoder/decoder module associated with the corresponding electronic device, which includes an infrared transmit encoder and an infrared receive decoder. To establish data communications, an electronic signal provided by one electronic device is converted into an optical signal, transmitted across the optical link (from one optical port to another), then converted into an electrical signal provided to another electronic device. Any other arrangements adapted to receive and/or transmit an optical signal that is converted into an electrical signal for data communications may be incorporated according to alternative embodiments. Particularly preferred embodiments of the present invention will employ infrared data communications, although the present invention is intended to include any arrangement by which a directed (i.e. line-of-sight) optical link may be employed for data communications, independent of the technology.

Although only a few exemplary embodiments of this invention have been described in detail above, those skilled in the art will readily appreciate that many modifications are possible in the exemplary embodiments without materially departing from the novel teachings and advantages of this invention. Alternative embodiments of the present invention may be employed in any environment (such as an office, laboratory, factory, home or the like) where data communications are provided between any electronic devices (such as computers, computing devices, networks, ports, peripherals, telephony, appliances, equipment or the like). Accordingly, all such modifications are intended to be included within the scope of the invention as defined in the following claims. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred embodiments without departing from the spirit of the invention as expressed in the appended claims.

What is claimed is:

1. In an office setting including a workstation adapted to provide for communication between a network and a computing device, the workstation having a worksurface and also having at least one network access point coupled to an optical network port, the computing device having a device access point coupled to an optical device port adapted for direct optical communication with the optical network port, wherein the improvement comprises:
    an optical access system including an access station installed within the workstation containing the optical network port so that the optical network port is selectively adjustable in a vertical direction by manually repositioning the optical network port within the workstation with respect to the computing device and the worksurface so that direct optical communication between the optical network port and the optical device port can be maintained within the workstation in avoidance of one or more objects that may obstruct direct optical communication;
    wherein the access station is supported on the worksurface and is angularly adjustable on the worksurface, and the optical network port is selectively adjustable in a horizontal direction and also wherein the access station includes a puck including the optical network port, horizontal adjustability of the puck being provided when the puck is moved along the worksurface and vertical adjustability of the puck being provided when the puck is moved to an edge-supported condition on an edge of the worksurface.

2. The system of claim 1 wherein the puck is a port device configured for movement along the worksurface.

3. The system of claim 1 wherein the access station includes an articulable stalk.

4. The system of claim 2 further comprising a hub coupled to the access station.

5. The system of claim 4 wherein the hub provides a compartment for at least one puck.

6. The system of claim 1 wherein the computing device is a portable computer having a base and a cover pivotally coupled thereto, wherein the optical device port of the portable computer is located on the back of the cover.

7. The system of claim 1 wherein the workstation includes a table providing the worksurface.

8. In an office setting including a workstation adapted to provide for communication between a network and a computing device, and also having at least one network access point coupled to an optical network port, the computing device having a device access point coupled to an optical device port adapted for direct optical communication with the optical network port, wherein the improvement comprises:
    a network access system including an access station installed within the workstation, the access station containing at least one optical network port;
    wherein the access station is a utility post providing a plurality of optical ports, and the utility post includes a plurality of articulable stalks, each articulable stalk containing one of the plurality of optical ports.

9. The system of claim 8 wherein the access station is configured so that the optical network port is selectively adjustable in both a vertical direction and a horizontal direction by manually repositioning the port device with respect to the computing device.

10. The system of claim 9 wherein the workstation further comprises a worksurface and the access station is configured so that direct optical communication between the device access point and the network access point can be maintained notwithstanding the presence of one or more obstacles on the worksurface.

11. The system of claim 8 wherein the access station is a hub providing a plurality of optical ports.

12. The system of claim 8 wherein the access station includes a receptacle for at least one stalk.

13. The system of claim 12 wherein the utility post includes a plurality of compartments.

14. The system of claim 12 wherein the utility post is vertically adjustable.

15. The system of claim 8 wherein the workstation includes a plurality of access stations.

16. The system of claim 8 wherein the workstation includes a plurality of access stations and provides for a plurality of network access points associated with a plurality of optical network ports so that direct optical communication may simultaneously be established with a plurality of computing devices within the workstation.

17. In an office setting including a workstation adapted to provide for communication between a network and a computing device, and also having at least one network access point coupled to an optical network port, the computing device having a device access point coupled to an optical device port adapted for direct optical communication with the optical network port, wherein the improvement comprises:

a network access system including an access station installed within the workstation, the access station containing at least one optical network port;

wherein the access station also includes a plurality of pucks, each of the plurality of pucks including an optical network port and being positionally adjustable within the workstation.

18. The system of claim 17 wherein the access station also includes a compartment for maintaining each of the plurality of pucks in a stowed position.

19. The system of claim 17 wherein the computing device is a portable computer having a base and a covering lid and the optical device port is located on the lid of the portable computer so that direct optical communication between the optical network port and the optical device port can be maintained notwithstanding the presence of one or more objects on the worksurface that may obstruct direct optical communication.

20. The system of claim 19 wherein the system further comprises an access station installed within the workstation and the optical network port is also selectively adjustable in both a horizontal direction and a vertical direction so that direct optical communication can be established at a level above and substantially parallel to the worksurface.

21. The system of claim 20 wherein each of the pucks is a port device configured for movement along a worksurface.

22. The system of claim 20 wherein the access station is supported on the work surface and is angularly adjustable on the worksurface.

23. The system of claim 17 wherein the workstation is adapted to provide for direct optical communication between a network and a computing device having a remote port, and wherein the workstation includes an article of furniture;

and also wherein the computing device is selectively adjustable in position relative to the article of furniture to establish a network connection within the workstation between the computing device and the network through the at least one network access point by establishing direct optical communication between the remote port and at least one of the plurality of optical network ports.

24. The workstation of claim 23 wherein at least one of the plurality of optical network ports of the access station are selectively adjustable in position relative to the article of furniture.

25. The workstation of claim 23 wherein the access station is at least partially embedded within the article of furniture.

26. The workstation of claim 23 wherein the article of furniture is a table.

27. The workstation of claim 23 wherein the article of furniture is a panel.

28. The workstation of claim 23 wherein the article of furniture is a desk.

29. The workstation of claim 23 wherein the article of furniture is a chair.

30. The workstation of claim 23 wherein the article of furniture is a bin.

31. The workstation of claim 23 wherein the article of furniture is a utility post.

32. The workstation of claim 23 wherein the optical network port is flexibly coupled to the access station and extendable from the article of furniture.

33. The workstation of claim 23 wherein the access station comprises a module selectively adjustable in position relative to the article of furniture.

34. The workstation of claim 23 wherein the access station comprises a compartment for storing the optical network port.

35. The workstation of claim 23 wherein the article of furniture is a table and the access station comprises a hub located at a substantially central location within a work surface provided by the table.

36. The workstation of claim 23 further comprising an optical network port housing containing the optical network port, the optical network port being selectively adjustable in orientation within the optical network port housing to selectively provide for alignment between the optical network port and the remote port of the computing device.

37. The workstation of claim 23 further comprising an optical network port housing containing the optical network port and adapted to selectively be positioned in contact with a generally horizontal work surface in a plurality of orientations to provide for alignment of the optical network port and the remote port of the computing device.

38. The workstation of claim 23 further comprising a chair adapted for seating a user of the computing device, a desk accessible to the user, and at least one panel positioned to provide at least partial visual privacy for the user, wherein the article of furniture is a table at which the computing device can be placed to establish the network connection.

39. The workstation of claim 23 wherein the at least one network access point comprises a plurality of network access points so that a plurality of computing devices may be connected to the network through the access station.

40. The workstation of claim 23 further comprising a plurality of access stations, each of the plurality of access stations adapted to provide for direct optical communication with at least one computing device.

* * * * *